Patented Oct. 25, 1949

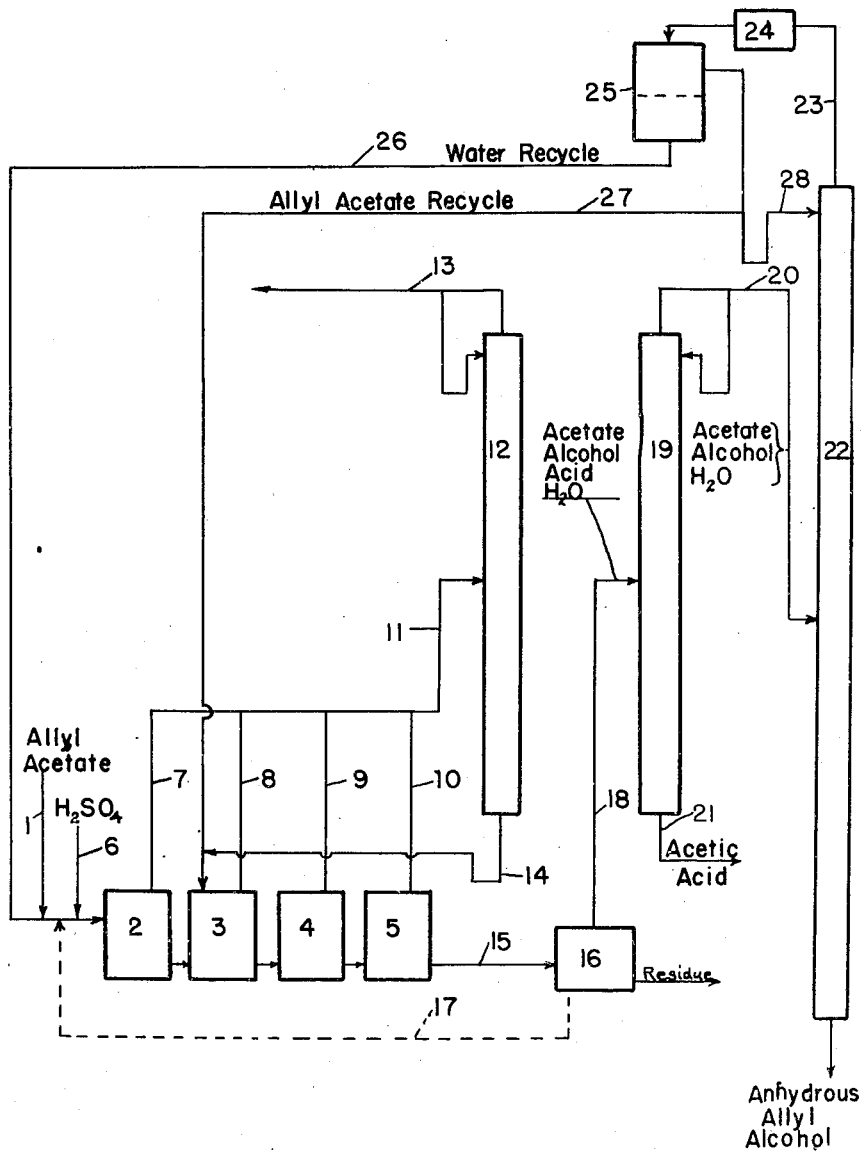

2,485,694

UNITED STATES PATENT OFFICE 2,485,694

DISTILLATION OF ALLYL ALCOHOL FROM HYDROLYSIS PRODUCTS

Paul E. Burchfield, Grosse Ile, Mich., assignor to Wyandotte Chemicals Corporation, Wyandotte, Mich., a corporation of Michigan Application February 16, 1945, Serial No. 578,309

1 Claim. (Cl. 202—42)

The present invention relating as indicated to the manufacture of allyl alcohol, has particular reference to the dehydration of the aqueous allyl alcohol product from the products of an acid hydrolysis, such as is involved in the synthesis of allyl alcohol from propylene glycol diacetate. This invention, accordingly, constitutes an improvement upon the allyl alcohol production process as set forth in the co-pending U. S. patent application of A. B. Ash et al. Serial No. 491,488, filed June 19, 1943, now Patent No. 2,441,540, granted May 11, 1948, wherein there are disclosed the following essential steps:

1. Pyrolysis of propylene glycol diacetate to allyl acetate and acetic acid.
2. Acid hydrolysis of the pyrolytic ester product followed by an alkaline hydrolysis.
3. An azeotropic distillation of the resultant product to produce anhydrous allyl alcohol.

A primary object of my invention is to eliminate the necessity for the alkaline hydrolysis as heretofore required in the above outlined allyl alcohol production process, while coincidentally eliminating the distillation step required for the separation of the allyl acetate-$H_2O$ CBM (constant boiling mixture) from the allyl alcohol-$H_2O$ CBM, and in addition utilizing the allyl acetate itself as a minimum entraining agent, thus eliminating the expense and burden of an extrinsically supplied entraining or extracting agent.

In the azeotropic distillation of alcohols generally, wherein the removal of water from a water and alcohol constant boiling mixture is involved, various extracting agents which are relatively immiscible in water, but highly solvent or miscible in the alcohols, have been added to the aqueous mixture to be distilled whereby the water from the constant boiling mixture is carried over with the extracting or entraining agent. Among such agents there may be mentioned by way of example, benzene, ethylene, chloride, trichlorethylene, carbon tetrachloride, esters, ethers and petroleum hydrocarbons. In the azeotropic distillation of allyl alcohol, more specifically, there has been disclosed the use of an added extracting agent comprising methylene chloride (see U. S. Patent No. 2,179,059) and mixed aliphatic ethers having six or more carbon atoms. In the use of such an extrinsically added or supplied entraining agent, there is necessarily involved the removal of carry-over of some of the allyl alcohol product which remains with the extracting agent. Also, the use of the added extracting agent involves the additional cost and handling of a material or compound which is extrinsic or foreign to the allyl alcohol production process itself. I have discovered that the allyl acetate, which is present in situ in the products of acid hydrolysis such as resulting from the allyl alcohol manufacturing process of the aforesaid application Serial No. 491,488, can be used not only as the entraining agent in the azeotropic distillation of allyl alcohol, but also results in a recovered product which can be returned and recycled to the chemical process for making an additional amount of allyl alcohol.

To the accomplishment of these and additional objectives and to enable any person skilled in the art readily to understand and practice the invention, the following full and concise description and annexed drawing set forth the best mode in which I have contemplated applying the principle thereof.

In said annexed drawing the single figure is a flow sheet illustrating the process embodying the principle of my invention. It will be understood that the customary methods for heating and cooling the stills, and effecting agitation and temperature control in the hydrolysis chambers, are to be incorporated in the various apparatus and equipment referred to in the accompanying flow sheet, and hence details thereof are not herein further illustrated.

Now referring more particularly to the drawing, the ester products of a pyrolysis of propylene glycol diacetate, consisting essentially of allyl acetate (approximately 75% by weight) and 1-acetoxy propene-1 (approximately 25% by weight) are introduced through the flow line 1 to the acid hydrolysis chambers 2, 3, 4 and 5. A suitable acid catalyst, such as $H_2SO_4$ is added at 6. As a result of the acid hydrolysis reaction in the chambers 2 to 5 inclusive, there are formed allyl alcohol, acetic acid and propionaldehyde. These hydrolysis products as vapors are continuously withdrawn through the lines 7, 8, 9 and 10 from the chambers from 2 to 5, respectively, and thence introduced through the line 11 to the distilling column 12, from the top of which the propionaldehyde is removed as indicated at 13. The bottoms from the still 12 are returned through the line 14 to the hydrolysis chamber 3.

The residual liquid material from acid hydrolysis chamber 5 is withdrawn from line 15 to the flash distillation chamber 16 wherein allyl acetate, allyl alcohol, acetic acid and water are removed as vapors from the sulfuric acid liquid residue. The sulfuric acid residue may be recycled if desired, by returning through the line 17 to the point of introduction of the initially added sulfuric acid catalyst, thereby decreasing consumption of sulfuric acid.

The overhead vapors of allyl acetate, allyl alcohol and water are fed through the line 18 to an intermediate point in the distilling column 19, from which allyl acetate, allyl alcohol and water are taken as overhead from the line 20 and water and acetic acid removed as bottoms, as indicated at 21. The overhead product in the line 20, consisting, for example, of a mixture of 50% allyl alcohol, 30% water and 20% allyl acetate, is then introduced to an intermediate point in the distilling column 22. In the column 22, the allyl acetate functions as the entraining or extracting agent, and together with water entrained from the allyl alcohol-water CBM, and some allyl alcohol, is taken off as overhead through the line 23 to the condenser 24 to the separator 25. The lower, essentially aqueous phase from the separator 25 is recycled through the line 26 to be introduced into acid hydrolysis chamber 2.

The allyl acetate-rich phase from the separator 25 is divided into two streams. One stream, equal in quantity to the amount of allyl acetate which is fed from the line 20 into the distilling column 22 is recycled through the line 27 for further hydrolysis in hydrolysis chamber 3. The second divided portion of the allyl acetate stream is led through line 28 to distilling column 22 where it is refluxed and vaporized and thus functions to remove more water from the feed mixture being introduced to the distilling column 22 from the line 20.

The product, anhydrous allyl alcohol, is continuously discharged from the bottom of still 22.

It will thus be seen that my above described process results in the elimination of additional steps and treatment, such as the alkaline hydrolysis step heretofore required in an allyl alcohol production process of the type herein referred to; results in a saving of cost of equipment, of acid catalyst and of alkaline reactant; eliminates the necessity for supplying an extrinsic or foreign entraining agent; and achieves a greater over-all efficiency and is essentially a continuous process.

Other modes of applying the principle of my invention may be employed, changes being made as regards to the details described, provided the features stated in the following claim or the equivalent of such be employed.

I, therefore, claim:

In the process of making allyl alcohol from a mixture of allyl alcohol, allyl acetate, acetic acid, propionaldehyde, sulfuric acid and water, the steps which consist in stripping propionaldehyde, flash distilling to remove sulfuric acid, conducting the vapors from such flash distillation to a distilling column to remove acetic acid as bottom stream, introducing the remaining allyl acetate, allyl alcohol and water mixture from said column to a second distilling column, removing allyl acetate and water from the top of said second column and anhydrous allyl alcohol from the bottom thereof, condensing the allyl acetate and water vapors from the top of said second column, separating excess water from the so formed condensate, dividing the allyl acetate of said condensate into two portions, and recycling one of said portions to said second column.

PAUL E. BURCHFIELD.

REFERENCES CITED

The following references are of record in the file of this patent:

UNITED STATES PATENTS

| Number | Name | Date |
| --- | --- | --- |
| 1,676,735 | Keyes | July 10, 1928 |
| 1,744,503 | Ricard | Jan. 21, 1930 |
| 2,179,059 | Slagh | Nov. 7, 1939 |
| 2,251,983 | Chitwood | Aug. 12, 1941 |
| 2,322,800 | Frey | June 29, 1943 |
| 2,441,540 | Ash | May 11, 1948 |

OTHER REFERENCES

Guinot et al., Transactions of the Institution of Chemical Engineers, vol. 16, pages 191, 192 (1938). (Copy in Sci. Lib.)

Palomaa et al., "Ber. der Deut. Chem. Gessell.," vol. 61B, pages 1770–6 (1928).